Aug. 29, 1967   J. W. KINNAVY ETAL   3,338,456
FRICTION CLOSURES
Filed Oct. 6, 1965

INVENTORS
JAMES W. KINNAVY &
HERMAN P. LANKELMA, Jr.

BY Mason, Porter, Diller & Brown
ATTORNEYS

United States Patent Office 3,338,456
Patented Aug. 29, 1967

3,338,456
FRICTION CLOSURES
James W. Kinnavy, Oak Lawn, and Herman P. Lankelma, Jr., Chicago, Ill., assignors to Continental Can Company, Inc., New York, N.Y., a corporation of New York
Filed Oct. 6, 1965, Ser. No. 493,411
7 Claims. (Cl. 220—42)

This invention relates to novel friction closures and is primarily directed to friction closures of the "Tripletite" type formed of metallic rings and plugs which are coated with a friction-increasing material to prevent the plugs from "popping" from the rings under in-use conditions.

Tripletite friction closures are well-known for their use with containers in which is packaged oil or water base paints. Over the years friction closures of the type including plugs and rings which are coated with conventional compound material have a tendency to "pop" under the influence of pressure built up in the containers. This tendency of conventional Tripletite closures to pop is increased to some extent by the conventional compound applied thereto which, while maintaining a relatively gastight seal, reduces the friction forces tending to retain the plugs and rings of the closure in assembled condition.

In accordance with this invention it is a primary object to substantially eliminate "popping" heretofore associated with Tripletite friction closures and to increase the friction forces retaining the plugs and rings in assembled relationship by coating friction walls of the rings, plugs or both with a coating solution of alkali metal salts and a solvent, particularly alkali metal salts of naphthenic acids, such as lithium naphthenate, sodium naphthenate, potassium naphthenate, etc. which have been unobviously found to increase the forces of friction retaining the plugs and rings in sealed relationship and thus substantially reduce conventional plug "popping" of such closures.

A further object of this invention is to provide friction closures of the type described in which the coating is selectively applied to limited areas of the rings, plugs or both to effectively reduce the cost of manufacture of the closures because of the limited amount of coating material required for each closure without in any way decreasing the improved sealing and friction-increasing characteristics of such closures as compared to conventional friction closures.

With the above and other objects in view that will hereinafter appear, the nature of this invention will be more clearly understood by reference to the following detailed description, the appended claims and the several views illustrated in the accompanying drawing:

Figure 1:
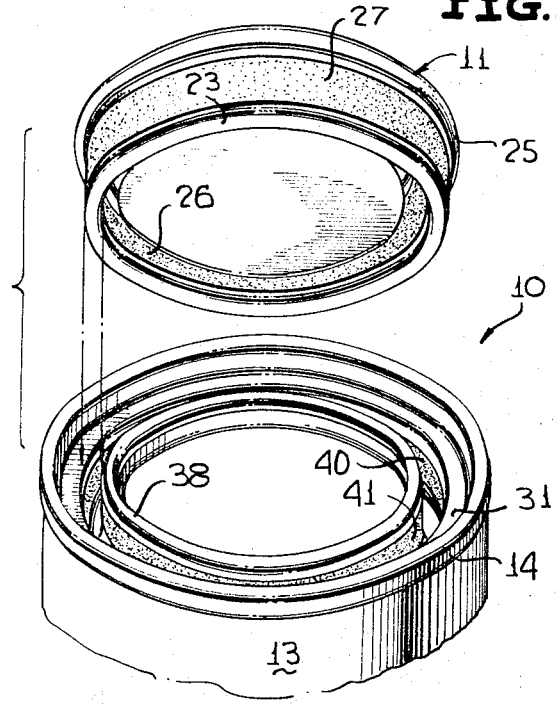
FIGURE 1 is an exploded perspective view of a friction closure constructed in accordance with this invention, and illustrates a ring thereof secured to a container, a plug positioned prior to friction fitment with the ring, and a coating of friction-increasing material on friction walls of the ring and plug.

A novel friction closure constructed in accordance with this invention is illustrated in the drawing and is generally referred to by the reference numeral 10. The friction closure 10 is of the Tripletite-type and is of a two-part construction i.e., a plug or plug portion 11 and a ring or ring portion 12, the latter being secured to a container 13 by a conventional double seam 14 (FIGURES 2 and 3).

The plug 11 of the friction closure 10 includes a recessed central panel 15 joined by a radius portion 16 to an annular wall 17. The annular wall 17 is joined by an integral radius portion 18 to a friction wall 20. The friction wall 20 is conventionally referred to as a "B" friction wall and includes a friction surface 21. The friction wall 20 is joined to an "A" friction wall 22 by a plug seat panel 23. The friction walls 20 and 22 are generally in parallel relationship and the friction wall 22 includes a friction surface 24 facing in a direction opposite to the friction surface 21 of the friction wall 20. The friction wall 22 terminates in an outwardly, downwardly and inwardly turned plug curl 25.

Prior to the formation of the plug 11 the surfaces 21, 24 of the friction walls 20, 22 respectively are provided with respective coatings 26, 27 of friction-increasing material which will be described fully hereinafter.

Figure 2:
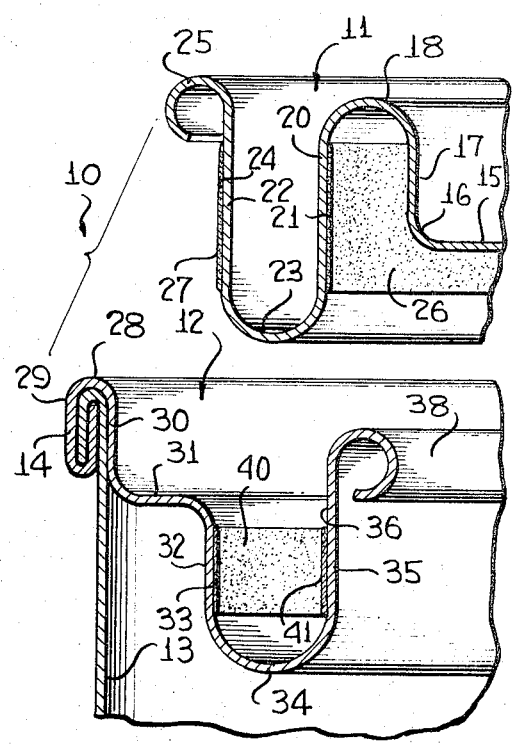
FIGURE 2 is an enlarged exploded fragmentary vertical sectional view of the friction closure of FIGURE 1, and more clearly illustrates the selective coating of the friction walls of the plug and ring.
Figure 3:
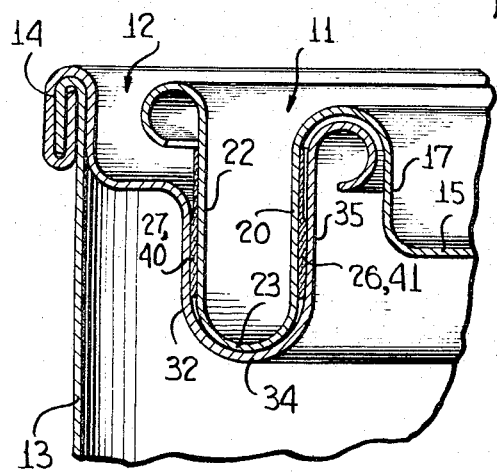
FIGURE 3 is a fragmentary vertical sectional view of the friction closure of FIGURE 2, and illustrates the plug in frictional engagement with the ring of the closure.

The ring 12 of the friction closure 10 includes a seam panel 29 forming a portion of the double seam 14, in the manner best illustrated in FIGURES 2 and 3 of the drawing. The seam panel 29 is joined by a radius portion 28 to a generally annular chuck wall 30. The chuck wall 30 is joined by a generally annular radially inwardly directed shoulder 31 to an "A" friction wall 32 having a friction surface 33. The friction wall 32 is joined by a ring seat panel 34 to a "B" friction wall 35 having a friction surface 36 opposing the friction surface 33 of the friction wall 32. The friction walls 32 and 35 are generally parallel to each other and define with the ring seat panel 34 a generally U-shaped channel (unnumbered) into which is received a complementary generally U-shaped portion (unnumbered) of the plug 11 defined by the walls 20, 22, 23, in a manner clearly illustrated in FIGURE 3 of the drawings. The friction wall 35 terminates in an inwardly, downwardly and outwardly turned curl 38.

Coatings 40, 41 of friction-increasing material are applied to major portions of the friction surfaces 33, 36 of the respective friction walls 32, 35.

Numerous different types of coating materials are associated with friction closures and are designed primarily to produce an efficient hermetic seal between the friction walls of the closures. Another consideration in the design of closures and the choice of coating materials is to maintain the friction forces at the friction walls as high as possible to prevent conventional plug "popping" i.e., the accidental unseating of closure plugs under the influence of built up pressure in containers. However, while certain materials are effective as sealers they are relatively ineffective as friction-increasing agents and vice-versa. That is, a coating material which produces an efficient hermetic seal tends to flow into minute cracks and crevices between opposed friction walls of the closures and is more often than not of a slippery nature, i.e., as a low co-efficients of friction. The opposite is true of coatings which have high co-efficients of friction i.e., they tend to provide an excellent friction closure but do not produce an optimum hermetic seal.

In accordance with this invention it has been found that coatings of alkali metal salts and a solvent satisfy both the requirement of a hermetic seal and a high co-efficient of friction. Thus, in accordance with this invention the coatings 26, 27, 40 and 41 are composed of alkali metal salts, such as lithium naphthenate, or other alkali metal salts and a solvent. The naphthenic acids are available commercially and are obtained primarily by refining petroleum with sulphuric acid and caustic. These acids include both the mono and bicyclic acids having boiling points ranging from 120° to 300° C. There are basically three different types of naphthenic acids depending upon the source of the petroleum product. These acids may contain from 6 to 20 carbon atoms and, in addition to lithium naphthenate, other alkali metal salts including potassium and sodium salts of the naphthenic acids may be used for the purpose of this invention. Any commercially available solvents, such as benzene, acetone, dimethylanilyn, isopropyl alcohol, etc. can be used in forming the coatings 26, 27 40, 41, with film weights of ten to twenty mg. per gallon being found effective in solutions of 50%—50% of solvent and alkali metal salts.

The plug 11 and the ring 12 are formed in substantially an identical matter, and the following description of the formation of the ring 12 will be sufficient for an understanding of the formation of the plug 11. The ring 12 is formed from a sheet (not shown) of relatively thin metallic material, such as tinplate. The sheet is conveyed by conventional conveying means (not shown) such as driven rolls, beneath a coating cylinder (also not shown). The coating cylinder includes a peripheral surface having a plurality of raised annular ring-like portions corresponding in shape and size to the coatings 40, 41. The solution of coating material is applied to the ring-like portions of the coating cylinder in a conventional manner and is transferred therefrom to the metallic sheet as the same passes beneath the coating cylinder at a speed substantially equal to the peripheral speed of the cylinder to obtain a transfer of the coating material without smearing.

The sheet is thereafter heated to drive off the solvent of the coating composition, is thereafter stamped into a plurality of generally circular blanks and each blank is then shaped to the configuration of the ring 12.

After the ring 12 has been secured by the double seam 14 to the container 13, the container 13 is packaged with material, such as paint, and the plug 11 is force-fitted upon the ring 12 in the manner illustrated in FIGURE 3 of the drawings. During this force-fitting of the plug 11 and the ring 12, the coatings 26, 27, 40 and 41 are in intimate contact and retain these elements in their assembled relationship. In fact, with coating compositions of the type heretofore described, the force required to remove the plug 11 from the ring 12 was increased by approximately one hundred pounds over conventional friction closures having conventional coating material between opposed friction surfaces thereof.

From the foregoing, it will be seen that novel and advantageous provision has been made for carrying out the desired end. However, attention is directed to the fact that variations may be made in the disclosed friction closures without departing from the spirit and scope of this invention, as defined in the appended claims.

We claim:
1. A two-piece closure for use with a container comprising a ring portion and a plug portion, said ring and plug portions including opposed friction walls adapted for frictional engagement upon the assembly of said ring and plug portions, a coating of friction-increasing material on the surface of at least one of said opposed friction walls whereby accidental removal of the plug portion from the ring portion under the influence of internal pressure in the container with which the closure is associated is precluded, and said coating being a solution of alkali metal salts and a solvent.

2. A two-piece closure for use with a container comprising a ring portion and a plug portion, said ring and plug portions including opposed friction walls adapted for frictional engagement upon the assembly of said ring and plug portions, a coating of friction-increasing material on the surface of at least one of said opposed friction walls, whereby accidental removal of the plug portion from the ring portion under the influence of internal pressure in the container is precluded, said coating being a solution of alkali metal salts and a solvent, and wherein said alkali metal salts are salts of naphthenic acids.

3. A two-piece closure for use with a container comprising a ring portion and a plug portion, said ring and plug portions including opposed friction walls adapted for frictional engagement upon the assembly of said ring and plug portions, a coating of friction-increasing material on the surface of at least one of said opposed friction walls, whereby accidental removal of the plug portion from the ring portion under the influence of internal pressure in the container is precluded, said coating being a solution of alkali metal salts and a solvent, said alkali metal salts being salts of naphthenic acids, and said solvent being isopropyl alcohol.

4. The two-piece closure as defined in claim 2 wherein the salts of the naphthenic acids comprises approximately 50% of the solution by weight.

5. A two-piece closure for use with a container comprising a ring portion and a plug portion, said ring and plug portions including opposed friction walls adapted for frictional engagement upon the assembly of said ring and plug portions, a coating of friction-increasing material on the surface of at least one of said opposed friction walls whereby accidental removal of the plug portion from the ring portion under the influence of internal pressure in the container with which the closure is associated is precluded, said coating being a solution of alkali metal salts and a solvent, said alkali metal salts are salts of naphthenic acids, and said coating being a solution of sodium naphthenate and a solvent.

6. A two-piece closure for use with a container comprising a ring portion and a plug portion, said ring and plug portions including opposed friction walls adapted for frictional engagement upon the assembly of said ring and plug portions, a coating of friction-increasing material on the surface of at least one of said opposed friction walls whereby accidental removal of the plug portion from the ring portion under the influence of internal pressure in the container with which the closure is associated is precluded, said coating being a solution of alkali metal salts and a solvent, said alkali metal salts are salts of naphthenic acids, and said coating being a solution of lithium naphthenate and a solvent.

7. A two-piece closure for use with a container comprising a ring portion and a plug portion, said ring and plug portions including opposed friction walls adapted for frictional engagement upon the assembly of said ring and plug portions, a coating of friction-increasing material on the surface of at least one of said opposed friction walls whereby accidental removal of the plug portion from the ring portion under the influence of internal pressure in the container with which the closure is associated is precluded, said coating being a solution of alkali metal salts and a solvent, said alkali metal salts are salts of naphthenic acids, and said coating being a solution of potassium naphthenate and a solvent.

References Cited
UNITED STATES PATENTS

| | | | |
|---|---|---|---|
| 2,199,528 | 5/1940 | Sebell | 113—121 |
| 2,705,088 | 3/1955 | Blarcom | 220—29 |
| 2,775,362 | 12/1956 | Henchert | 220—42 |

THERON E. CONDON, *Primary Examiner.*

G. T. HALL, *Assistant Examiner.*